May 30, 1933.  J. W. COSGROVE  1,911,437
SUPPORT
Original Filed Oct. 2, 1924
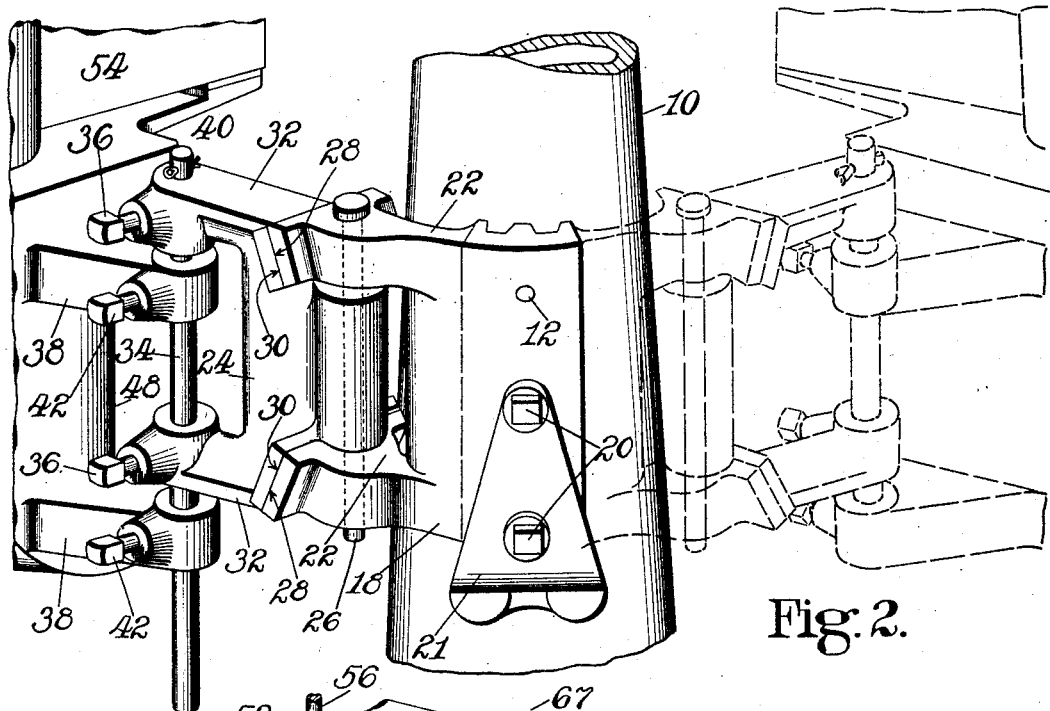
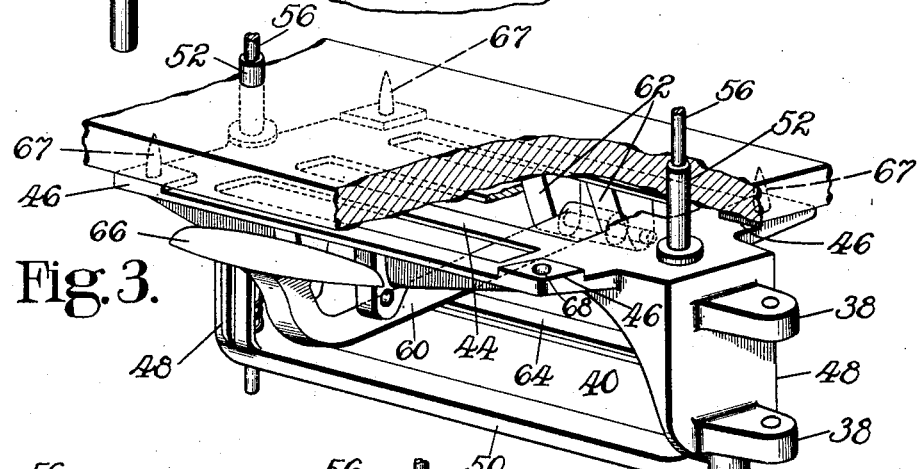
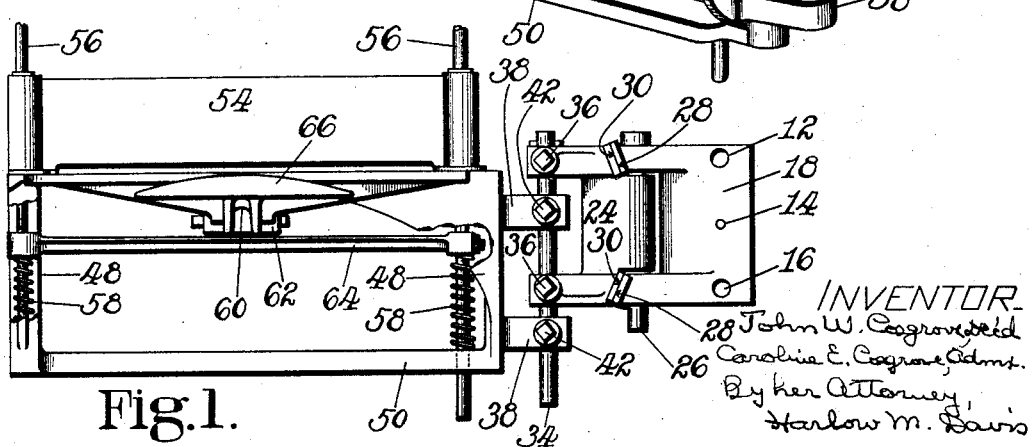
INVENTOR
John W. Cosgrove dec'd
Caroline E. Cosgrove Admx.
By her Attorney,
Harlow M. Davis Patented May 30, 1933

1,911,437

UNITED STATES PATENT OFFICE

JOHN W. COSGROVE, DECEASED, LATE OF MEDFORD, MASSACHUSETTS, BY CAROLINE E. COSGROVE, ADMINISTRATRIX, OF MEDFORD, MASSACHUSETTS, ASSIGNOR TO UNITED SHOE MACHINERY CORPORATION, OF PATERSON, NEW JERSEY, A CORPORATION OF NEW JERSEY

SUPPORT

Original application filed October 2, 1924, Serial No. 741,203. Divided and this application filed March 3, 1931. Serial No. 519,773.

The invention relates to devices for mounting apparatus in various positions for convenient use by an operator, it being of special utility in connection with pasting apparatus which it may be desired to support in different operating relations and this application is a division of a prior application Serial No. 741,203, filed October 2, 1924, for improvements in mounting devices, which has matured into Letters Patent of the United States No. 1,830,593, granted Nov. 3, 1931.

A pasting apparatus such as may be used for applying adhesive to the counters of shoes is sometimes supported upon a bench or is frequently more convenient for the operator if mounted directly upon the machine in connection with the operation of which the coated counters are used, such as an assembling machine. A pasting apparatus of the type under consideration usually comprises a receptacle for the paste, a grid mounted for reciprocating movement into and out of the receptacle, actuating mechanism for this grid, and means, such as a lever, adapted to be connected to the actuating mechanism.

An object of the invention is to provide an improved support adapted for use either upon a bench or upon the column of a machine such as one of the type referred to by means of which the apparatus may readily be located and provision made for the operating mechanism thereof.

In the illustrated machine and in accordance with features of the invention, the novel support comprises a frame having a top plate provided with openings to receive securing means by which it may be attached to the under side of a bench, for example, and also having side bars depending from the frame one of which is provided with laterally extending arms having vertically alined openings to receive a securing spindle which is used when the support is mounted upon a bracket attached to a machine column. The illustrated frame has projections rising from its top plate which are adapted to locate the pasting apparatus and these projections are provided with guideways for the reception of rods connected to the actuating mechanism of the apparatus. On the under side of the support bearing lugs are preferably provided for the reception of a lever adapted to be connected to said actuating mechanism and, as illustrated, these lugs are provided in duplicate so that the actuating lever may extend in either one of two directions from the support, said lever being guided against lateral deflection by the other pair of lugs.

A single embodiment of the invention is illustrated in the accompanying drawing, where Fig. 1 shows the improved mounting device arranged for attachment to a machine column and carrying a paste-pan;

Fig. 2 is a perspective view of the portions of the device most closely associated with the column and attached thereto, its reverse position appearing in dotted lines; and Fig. 3 shows, in front elevation, the support and pan associated with a bench.

Referring particularly to Figs. 1 and 2, a column 10, which may be a part of the frame of an assembling machine, is provided at its side with two threaded openings situated one above the other, and with which may be respectively alined two of a series of three openings 12, 14 and 16 formed in the securing plate of a bracket 18. This bracket has a ribbed inner surface (Fig. 2). The central opening 14 is of such diameter as to permit a securing screw 20 to pass freely through it but substantially to fill it. The upper and lower openings are made larger than the corresponding screw 20 so that the bracket may be adjusted about the screw in the center opening 14, to bring the supported parts into the correct horizontal relation. It is then fixed in place by tightening the screw 20 in the next lower opening as it hangs on the upper screw, thereby to cause the ribs to bind upon the column. In Fig. 2 there appears, associated with the bracket beneath the heads of the screws, a plate 21, which has no direct connection with the present invention, it serving as an abutment for a compression spring of the assembling machine. By placing the opening 14 over the upper column opening, and either the opening 12 or the opening 16 in registration with the lower column opening, the bracket 18 may be caused to extend either to the right or the left of the column 10, as may be preferred by the operator, and fixed by the screws 20. From the securing plate of the bracket extend horizontal arms 22, 22, at the outer extremities of which are vertically alined openings. Entering the space between the arms is the inner end of an extension arm 24, in which is a vertical opening for alinement with those of the bracket. The extension is secured in place by a headed spindle 26 passing through all these vertical openings. When the elements are thus assembled, there come into contact pairs of opposite faces 28 and 30, formed respectively upon the bracket arms and extension arm, and lying upon both sides of the spindle. These faces are shown as so inclined that the two pairs converge inwardly, and, when drawn together by the insertion of the spindle in the openings, hold the extension firmly against movement, both about the spindle as an axis and also vertically thereon. The extension becomes, in effect, an immovable portion of the bracket. Nevertheless, separation of the extension arm or its restoration to position are permitted simply by the removal or insertion of the spindle 26. The contact faces 28 and 30 are symmetrically placed upon the bracket and extension, so their effect is the same, regardless of whether the bracket projects to the right or left of the column. The extension arm is divided to form portions 32, and at the outer ends of these divided portions are vertical openings, to receive a spindle 34 fixed in place in the extension by set-screws 36, 36 threaded through the sides of the divided portions.

Arranged to turn about the spindle 34 are the separated arms 38, 38 of a support 40. The support may be located at different heights along the spindle and at different angles about it, to suit the needs of the operator of the machine, and fixed in place by set-screws 42 threaded into the arms 38. The support is shown as comprising a frame including a rectangular top-plate 44 having openings to lighten the structure, and provided at each of its corners with a slightly elevated contact lug 46. From the central portions of the opposite extremities of the support depend side bars 48, 48, one of which carries, formed integrally upon it, the arms 38. A cross-bar 50, connecting the lower extremities of the bars 48, strengthens the support and serves as an abutment for operating elements of the apparatus it carries, as will later appear. Rising from the extremities of the top-plate, above the bars 48, are tubular projections 52, 52. When a paste-pan, as is illustrated at 54, is to be mounted upon the support, these projections enter vertical openings in it, locating it exactly with relation to the support and to actuating elements for the pasting apparatus, which may be carried thereby. These projections also receive, through vertical bores, reciprocatory rods 56, 56, upon which the grid of the pasting apparatus may be supported and actuated. This grid is not herein illustrated. Springs 58, 58 (Fig. 1) surround the rods, being interposed between a bar 64 fixed to said rods and the bar 50. The bars 64 and 50 are engaged by the upper and lower ends of the springs, respectively. These springs serve to maintain the grid normally raised out of the paste within the pan. To lower the grid for the purpose of effecting its immersion in the paste, the support is provided with a lever 60 which may be pivoted upon either of two pairs of lugs 62, 62. These lugs are formed at opposite sides of the under surface of the top-plate, one pair or the other being employed as bearings for the lever 60, depending upon which side of the machine column the support is mounted, while the other lugs serve as guides for the lever to prevent its lateral deflection. The lever 60 bears upon the bar 64, and, when lowered, as by pressure upon a finger-piece or pad 66, draws down the rods to carry the grid into the pan.

If the support is to be mounted upon the bracket, the pan preferably rests directly upon the top-plate 44, as appears in Fig. 1. If it is desired to mount the paster upon a bench (Fig. 3), the support is secured to the under side of said bench by screws 67 extending through openings 68 in the lugs 46 of the top plate 44. The projections 52 then pass through holes bored in the bench, and are of sufficient length to extend above its upper surface to enter the openings in the pan 54, and thus correctly locate it with respect to the grid supported upon the rods 56.

From what has been hereinbefore stated, it will be seen that the improved device is organized to support a pasting or other apparatus either upon a machine frame or upon a bench. In the first instance, it is only necessary to attach the bracket 18 by two screws, and insert the spindle 26 through the openings in the bracket and extension. When thus mounted, the extension is securely held against movement upon the bracket, both laterally and vertically, but may be removed with the support and pasting apparatus as a unit by simply withdrawing the spindle. The support is maintained at a convenient distance from the column by this mounting, and is adjustable to the best operating position by means of the screws 42. Separation of the extension with the support and pasting apparatus, reversal of the bracket and the reassembling of the extension with the associated elements locate the apparatus at the opposite side of the machine. The support employed alone, without change, serves to mount the pasting apparatus upon a bench by the insertion of four screws, all the actuating elements of the apparatus being carried with the support undisturbed.

The invention having been described, what is claimed as new and desired to be secured by Letters Patent of the United States is:

1. A device adapted for mounting a pasting apparatus upon a machine frame comprising a bracket adapted to be reversibly secured to said frame, a separable arm secured to said bracket constructed and arranged for binding engagement therewith in either position and normally held against movement on the bracket, a support for the apparatus upon the arm, and means for mounting an actuating member for said apparatus upon said support.

2. The combination with a frame having a top-plate provided with openings to receive securing means, projections rising from the top-plate adapted to locate apparatus associated therewith, side bars depending from the frame, and arms extending from one of the bars and having vertically alined openings arranged to receive a securing spindle.

3. A mounting device including a support for a pasting apparatus, said support being provided with upstanding projections arranged to facilitate the location of the apparatus on the support, said projections being provided with guideways for the reception of actuating mechanism connected with the apparatus, and bearings upon the under side of said support for the reception of a lever adapted to be connected to said actuating mechanism.

4. A mounting device for a pasting apparatus comprising a support, said support being provided with upstanding projections arranged to facilitate the location of the apparatus upon the support, and duplicate bearing lugs upon the under side of said support adapted reversibly to receive an actuating lever for said apparatus, one set of lugs providing a pivotal support for said lever and the other set of lugs serving to prevent lateral deflection of said lever.

5. A mounting device for a pasting apparatus comprising a support, said support being provided with guideways for the reception of actuating mechanism connected with the apparatus, and duplicate bearing lugs upon the under side of the support either set of which is adapted to serve as a fulcrum for a lever adapted to be connected to said actuating mechanism and the other set of which guides said lever and prevents lateral deflection thereof.

6. A mounting device for a pasting apparatus comprising a substantially rectangular support, said support being provided with guideways at its opposite ends for the reception of actuating rods connected to the mechanism of the pasting apparatus, and duplicate bearing lugs for an actuating lever adapted to be connected to said rods and to extend in either one of two directions from said support, said bearing lugs being provided upon the under side of said support between its ends and arranged upon opposite sides thereof to permit the lever to be pivotally supported in either pair of said bearing lugs while it is guided against lateral deflection by the other pair of lugs.

In testimony whereof I have signed my name to this specification.

CAROLINE E. COSGROVE,
*Administratrix of the Estate of John W. Cosgrove, Deceased.*